(12) United States Patent
Gu

(10) Patent No.: US 10,580,124 B2
(45) Date of Patent: Mar. 3, 2020

(54) INSPECTION DEVICE, CONTROL METHOD AND CONTROL APPARATUS FOR THE SAME

(71) Applicant: BOE TECHNOLOGY GROUP CO., LTD., Beijing (CN)

(72) Inventor: Yu Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/128,909

(22) Filed: Sep. 12, 2018

(65) Prior Publication Data
US 2019/0295241 A1 Sep. 26, 2019

(30) Foreign Application Priority Data
Mar. 23, 2018 (CN) .......................... 2018 1 0246797

(51) Int. Cl.
*H04N 7/18* (2006.01)
*G06T 7/00* (2017.01)
(Continued)

(52) U.S. Cl.
CPC ......... *G06T 7/0002* (2013.01); *G05D 1/0234* (2013.01); *G05D 1/0246* (2013.01);
(Continued)

(58) Field of Classification Search
CPC ........ G05D 2201/0213; G05D 1/0088; B60W 30/12; G06K 9/4633; G08G 1/167; B62D 15/025
See application file for complete search history.

(56) References Cited

U.S. PATENT DOCUMENTS 8,473,144 B1 * 6/2013 Dolgov ............... B60W 30/095
 701/28
2013/0197758 A1 * 8/2013 Ueda .................... G05D 1/0088
 701/41

(Continued)

FOREIGN PATENT DOCUMENTS

CN 202134079 U * 2/2012
CN 105260713 A 1/2016
(Continued)

OTHER PUBLICATIONS

Chinese Office Action dated Nov. 28, 2019, from application No. 201810246797.1.

*Primary Examiner* — Sath V Perungavoor
*Assistant Examiner* — Peet Dhillon
(74) *Attorney, Agent, or Firm* — Foley & Lardner LLP

(57) ABSTRACT

The present disclosure provides an inspection device, a control method and a control apparatus for the same, and relates to the technical field of inspection patrol. The inspection device can patrol in a lane which has at least one lane line. The control method includes collecting an environment image around the inspection device. The control method includes identifying the lane line from the environment image. The control method includes determining a distance between the inspection device and the lane line. The control method includes determining a deviation between the inspection device and a preset route in the lane according to the distance between the inspection device and the lane line. The control method includes controlling the inspection device to move toward the preset route according to the deviation.

17 Claims, 6 Drawing Sheets

(51) Int. Cl.
- *G06T 7/50* (2017.01)
- *G06T 7/73* (2017.01)
- *G06T 7/90* (2017.01)
- *G05D 1/02* (2020.01)
- *G06K 9/38* (2006.01)
- *G06K 9/46* (2006.01)
- *G06K 9/62* (2006.01)
- *H04N 5/247* (2006.01)

(52) U.S. Cl.
CPC ............ *G06K 9/38* (2013.01); *G06K 9/4604* (2013.01); *G06K 9/6232* (2013.01); *G06K 9/6261* (2013.01); *G06K 9/6267* (2013.01); *G06T 7/50* (2017.01); *G06T 7/73* (2017.01); *G06T 7/90* (2017.01); *H04N 5/247* (2013.01); *G06T 2207/20021* (2013.01); *G06T 2207/30241* (2013.01); *G06T 2207/30256* (2013.01)

(56) References Cited

U.S. PATENT DOCUMENTS

| | | |
|---|---|---|
| 2014/0197758 A1 | 7/2014 | Thomas |
| 2015/0178574 A1* | 6/2015 | Suzuki ............... G06K 9/00798 382/103 |

FOREIGN PATENT DOCUMENTS

| | | |
|---|---|---|
| CN | 105447892 A | 3/2016 |
| CN | 107066952 A | 8/2017 |

* cited by examiner

INSPECTION DEVICE, CONTROL METHOD AND CONTROL APPARATUS FOR THE SAME

CROSS REFERENCE

The present application claims the priority of Chinese Patent Application No. 201810246797.1, filed on Mar. 23, 2018, and the entire contents thereof are incorporated herein by reference as part of the present application.

TECHNICAL FIELD

The present disclosure relates to the technical field of inspection patrol, and in particular, to an inspection device, a control method and a control apparatus for the same.

BACKGROUND

In order to ensure the safety of the highway, it is necessary to frequently check the condition of the road surface in order to maintain the road surface in time. At present, in order to improve the detection efficiency, special inspection device such as inspection robots are often used to detect cracks and flatness of the road surface, road geometry data, road surface damage, and the like, thus improving the efficiency of road surface detection.

The existing inspection device can usually patrol in the lane along a preset route, and take an image of the road surface with a camera, and the road information can be obtained by processing the image information to analyze the road surface condition.

It should be noted that, the information disclosed in the above background is provided only for better understanding of the background of the present disclosure, and thus it may contain information that does not form the prior art known by those ordinary skilled in the art.

SUMMARY

The present disclosure provides an inspection device capable of automatically correcting a patrol route, a control method and a control apparatus for the same.

According to an aspect of the present disclosure, a control method for an inspection device for an inspection device patrolling in a lane is provided, the lane having at least one lane line, the control method includes:
collecting an environment image around the inspection device. The method includes
identifying the lane line from the environment image. The method includes determining a distance between the inspection device and the lane line when at least one lane line is identified. The method includes
determining a deviation between the inspection device and a preset route in the lane according to the distance between the inspection device and the lane line. The method includes
controlling the inspection device to move toward the preset route according to the deviation.

In an exemplary arrangement of the present disclosure, the collecting the environment image around the inspection device includes collecting a first environment image at one side of the inspecting device and a second environment image at another side of the inspecting device.

In an exemplary arrangement of the present disclosure, the identifying the lane line from the environment image includes identifying the lane line according to red component and green component in the environment image.

In an exemplary arrangement of the present disclosure, identifying the lane line from the environment image includes preprocessing the environment image to obtain a grayscale image of the environment image. Identifying the lane line from the environment image further includes transforming the grayscale image to obtain a feature image, binarizing the feature image to obtain a binary image, and performing a straight-line detection on the binary image, and extracting the lane line.

In an exemplary arrangement of the present disclosure, preprocessing the environment image includes performing gradation processing on the environment image, and extracting a preset area of the gradation processed environment image as the grayscale image.

In an exemplary arrangement of the present disclosure, the grayscale image is a single channel grayscale image.

In an exemplary arrangement of the present disclosure, binarizing the feature image to obtain the binary image includes dividing the feature image into a plurality of windows. Binarizing the feature image to obtain the binary image further includes classifying, according to a preset grayscale threshold, pixels in each window of the plurality of windows into a first group of pixels having grayscales equal to or greater than the preset grayscale threshold and a second group of pixels having grayscales smaller than the preset grayscale threshold. Binarizing the feature image to obtain the binary image further includes setting the grayscales of the pixels in the first group as 255. Binarizing the feature image to obtain the binary image further includes setting the grayscales of the pixels in the second group as 0.

In an exemplary arrangement of the present disclosure, extracting the lane line includes performing the straight-line detection on the binary image to obtain a plurality of candidate lines. Extracting the lane line further includes removing candidate lines having a length less than a preset length. Extracting the lane line further includes determining a number of reference points of each of the remaining candidate lines. The reference point is a point on the binary image that is less than a preset distance from the candidate line. Extracting the lane line further includes selecting the candidate line having the largest number of reference points as the lane line.

In an exemplary arrangement of the present disclosure, determining the number of the reference points includes fitting each remaining candidate line within a preset neighborhood. Determining the number of the reference points further includes calculating the number of the reference points.

In an exemplary arrangement of the present disclosure, determining a distance between the inspection device and the lane line includes calculating lane line coordinates. The lane line coordinates are coordinates of a center point of the lane line on the environment image. Determining a distance between the inspection device and the lane line further includes converting the lane line coordinates into world coordinate system to obtain relative coordinates, wherein the relative coordinates is coordinates of the lane line relative to the inspection device. Determining a distance between the inspection device and the lane line further includes determining the distance between the inspection device and the lane line according to the relative coordinates and coordinates of the inspection device.

In an exemplary arrangement of the present disclosure, the preset route is a center line of the lane.

In a case where only one lane line is identified, the deviation is a difference between the distance between the inspection device and the lane line and the distance between the lane line and the center line.

In a case where two lane lines are identified, the deviation is a difference between the distances of the inspection device and the two lane lines.

In an exemplary arrangement of the present disclosure, the two lane lines include a left lane line and a right lane line, and the deviation is a difference between a distance between the inspection device and the left lane line and a distance between the inspection device and the right lane line. Controlling the inspection device to move toward the preset route of the lane includes controlling the inspection device to move to the right when the deviation is negative. Controlling the inspection device to move toward the preset route of the lane further includes controlling the inspection device to move to the left when the deviation is positive.

In an exemplary arrangement of the present disclosure, controlling the inspection device move toward the preset route of the lane includes determining a correction distance according to a preset correction angle, the correction angle being an angle at which the inspection device moves toward the preset route. A relationship between the correction angle, the correction distance, and the deviation is:

$$1 = \frac{\Delta d}{\cos \theta}.$$

In the above equation, $\Delta d$ is the deviation, $\theta$ is the correction angle, and 1 is the correction distance. Controlling the inspection device move toward the preset route of the lane further includes controlling the inspection device to travel the correction distance at the corrected angle.

According to an aspect of the present disclosure, a control device for an inspection device patrolling in a lane is provided, the lane having at least one lane line, the control device includes
   an image collecting circuit configured to collect an environment image around the inspection device. The control device further includes
   an identification circuit configured to identify the lane line from the environment image.
   The control device further includes a ranging circuit configured to determine a distance between the inspection device and the lane line when at least one lane line is identified.
   The control device further includes a deviation calculation circuit configured to determine a deviation between the inspection device and a preset route of the lane according to the distance between the inspection device and the lane line.
   The control device further includes a correction circuit configured to control the inspection device to move toward the preset route according to the deviation.
   In an exemplary arrangement of the present disclosure, the inspection device includes
   an image capturer configured to capture the environment image around the inspection device.
   In an exemplary arrangement of the present disclosure, the image capturer includes
a first camera disposed on a first side of the inspection device and configured to collect a first environment image on the first side of the inspection device. The image capturer includes a second camera disposed on a second side of the inspection device and configured to collect a second environment image on the second side of the inspection device.

According to an aspect of the present disclosure, an inspection device includes the control device for an inspection device according to any one of the above is provided.

According to an aspect of the present disclosure, a control apparatus for an inspection device for patrolling in a lane is provided, the lane having at least one lane line, the control apparatus includes
   a processor, and
      a memory storing computer readable code, which enables the processor to perform the control method for the inspection device according to present disclosure when computer readable code is executed.
   In an exemplary arrangement of the present disclosure, the inspection device includes
      an image capturer configured to capture the environment image around the inspection device.
   The image capturer includes
      a first camera disposed on a first side of the inspection device and configured to collect a first environment image on the first side of the inspection device.
   The image capturer includes a second camera disposed on a second side of the inspection device and configured to collect a second environment image on the second side of the inspection device.

According to an aspect of the present disclosure, an inspection device includes the control apparatus for an inspection device according to any one of the above is provided.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate arrangements of present disclosure and together with the specification serve to explain the principles of present disclosure. Obviously, the drawings described below are merely some arrangements of the present disclosure. For those skilled in the art, other drawings can be obtained based on these drawings without any creative work.

DETAILED DESCRIPTION

Figure 1:
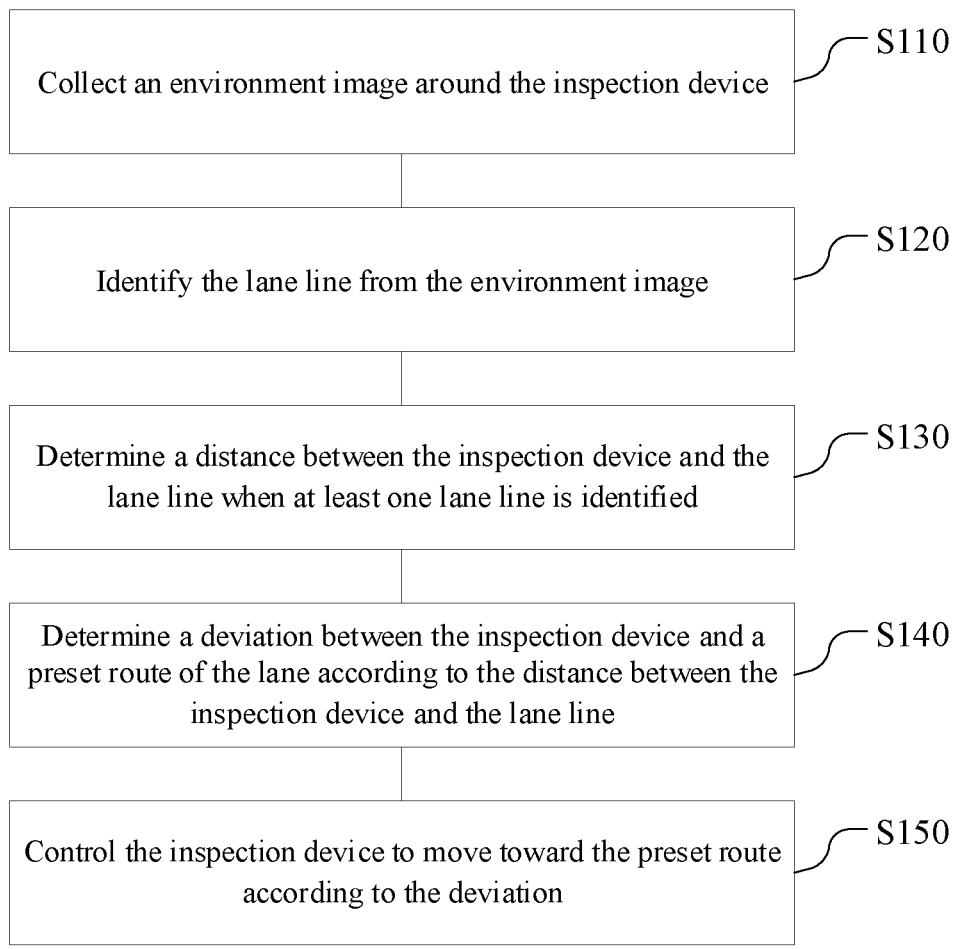
FIG. 1 is a flowchart of a control method according to an arrangement of the present disclosure.

Exemplary arrangements will now be described in detail with reference to the accompanying drawings. Exemplary arrangements may, however, be exemplified in many different forms and should not be construed as being limited to the examples set forth herein. Rather, these exemplary arrangements are provided so that this disclosure will be thorough and complete, and will fully convey the concepts of the disclosure to those skilled in the art. A particular feature, structure, or characteristic described can be combined in one or more arrangements in any suitable manner. In the following description, numerous specific details are set forth to provide a thorough understanding of the arrangements of the present disclosure. However, it will be appreciated by one ordinary skill in the art that the technical solutions of the present disclosure may be practiced and one or more of the specific details may be omitted, or other methods, components, devices, steps, etc. may be employed. In other instances, well-known technologies have not been illustrated or described in detail in order to avoid obscuring aspects of the present disclosure.

Furthermore, the drawings are merely schematic representations of the present disclosure and are not necessarily drawn to scale. The same reference numbers will be used throughout to designate the same or similar elements, and the repeated description of the components is omitted. Some of the block diagrams shown in the figures are functional entities and do not necessarily have to correspond to physically or logically separate entities. These functional entities may be implemented in software, or implemented in one or more hardware modules or integrated circuits, or implemented in different network and/or processor devices and/or microcontroller devices.

The terms "a", "an", and "the" are used to mean the presence of one or more elements/components, etc.; the terms "including" and "having" are intended to be inclusive and mean that there may be additional elements/components/etc. other than the listed elements/components/etc.; the terms "first", "second", etc. are used only as reference numerals and are not intended to limit the number of objects.

An exemplary arrangement of the present disclosure provides a control method for an inspection device for an inspection device which can patrol along a preset route in a lane of a highway, and the lane can be divided by a lane line and the lane has at least one lane line, for example, the lane may have two lane lines, that is the lane is defined between two lane lines, the preset route may be the centerline of the lane. Meanwhile, the inspection device may be an inspection robot, and may also be other devices that can be used to drive in the lane and detect the road surface.

As shown in FIG. 1, the control method for the inspection device of the present arrangement may include:

S110, collecting an environment image around the inspection device;

S120, identifying the lane line from the environment image;

S130, determining a distance between the inspection device and the lane line when at least one of the lane lines is identified;

S140, determining a deviation between the inspection device and a preset route of the lane according to the distance between the inspection device and the lane line;

S150, controlling the inspection device to move toward the preset route according to the deviation.

The control method of the inspection device according to an example arrangement of the present disclosure can identify at least one lane line from the real-time collected environment image, and control the inspection device to automatically move toward the preset route of the lane according to the deviation between the inspection device and the lane turns, and thus the automatic correction of the inspection device is realized, which is beneficial to ensure the detection effect. At the same time, it can automatically steer as the lane turns, thus reducing manual control and improving detection efficiency. Accordingly, the arrangement of the present disclosure can solve the problem that it is difficult to accurately collect an image of a road surface and the reliability of the detection result may be affected once the inspection device deviates from the preset route due to the limited field of view of the camera. At the same time, the arrangement of the present disclosure can also solve the problem that the existing inspection device cannot automatically steer when the lane turns, and the manual steering is required.

It should be understood that the "collecting" referred to in the present disclosure may include capturing a corresponding image with a camera, and also collecting an image captured by a camera or other external device through a corresponding data interface.

As an example where the lane has two lane lines and the preset route is the center line of the lane, the control method of the present arrangement are further described:

In S110, an environment image around the inspection device is collected.

The environment image around the inspection device may include environmental images on both sides of the inspection device. A camera may be installed on the left and right sides of the inspection device respectively, and the environment images on both sides of the inspection device are captured in real time with the two cameras to obtain a left environment image which may include a left lane line and a right environment image which may include a right lane line. The environment image captured by the camera is an RGB image (R is for red, G is for green, and B is for blue). In other arrangements of the present disclosure, the environmental image may also be a grayscale image.

In S120, the lane line is identified from the environment image.

Figure 2:
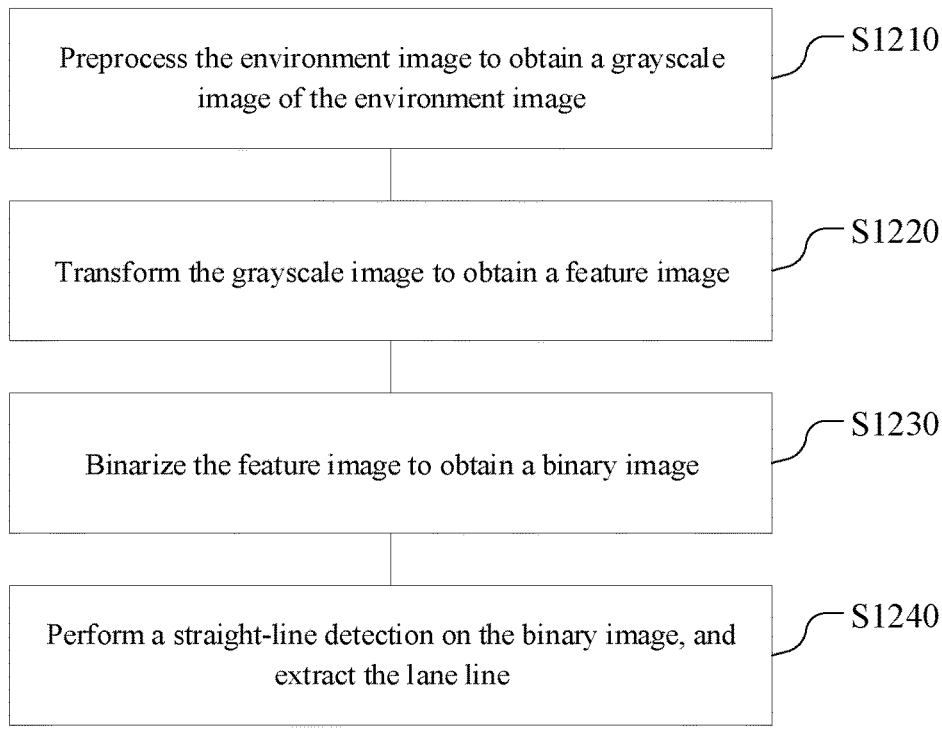
FIG. 2 is a flowchart of S120 in FIG. 1.

As shown in FIG. 2, S120 may include S1210 to S1240.

In S1210, the environment image is preprocessed to obtain a grayscale image of the environment image. The pre-processing can include the followings.

The environment image can be represented by gray scale. In particularly, the gray value can be calculated by a preset gray scale calculation formula, and the environment image is represented by gray scale to obtain a single channel gray scale image. The gray scale calculation formula is $F=0.5\times R+0.5\times G$, where F is for grayscale, R is for red, and G is for green. In some arrangements, using the gray scale calculation formula to calculate the gray value may be referred to as a gradation process. Since the red and green components of a yellow color are relatively large, and a white color can also be obtained by the red component and the green component, the red and green channels in the lane line have good contrast characteristics for the white and yellow lines, when the lane line is white or yellow line, the red and green components can be used to extract both the white and yellow lines, which makes the lane line clearer.

A preset area is extracted from the grayscale-processed environment image, and the image of the preset area is a desired grayscale image. Since the grayscale-processed environment image is a single-channel grayscale image, the grayscale image is also a single-channel grayscale image, so that the lane line is more clear and easy to recognize. The preset area may be an area within a certain range around a lane line, thus performing rough selection and removing some images unrelated to the lane line to extract the lane line.

In S1220, the grayscale image is transformed to obtain a feature image.

Gray image can be transformed by DLD transform and DLDLD transform, where D represents dark, L represents light, DLD transform, i.e. dark-light-dark transform, can be used to extract single lane line features; DLDLD transform, i.e. dark-light-dark-light-dark transform can be used to extract the two lane line features.

In the transformation, DLD transformation and DLDLD transformation can be performed at the same time. For example, based on the DLD transformation formula and the DLD transformation formula, the lane line features can be extracted according to the dark-light-dark features and the dark-light-dark-light-dark features to get the feature image.

DLD transformation formula is:

$$DLD(x,y)=\max(\min(src[x,y]-src[x-2,y],src[x,y]-src[x+2,y]),0);$$

DLD transformation formula is:

$$DLDLD(x,y)=\max(\min(src[x-3,y]-src[x-5,y],src[x-3,y]-src[x,y],src[x+3,y]-src[x+5,y],src[x+3,y]-src[x,y]),0).$$

In the above formula, src represents the level of the gray scale (ie, the pixel value), for example, src(x, y) represents the level of the gray scale of point (x, y) on the image. In addition, max means taking the maximum value, and min means taking the minimum value.

In other arrangements of the present disclosure, the above-described feature images may also be obtained in other ways, not to be all inclusive. In S1230, the feature image is binarized to obtain a binary image.

The above feature image can be binarized to obtain a binary image. In particular, a local threshold binarization process may be used. For example, the feature image may be divided into a plurality of windows according to a preset rule which may be a rule for limiting the size of the window. For example, the size of each window is 1×32. For each of the plurality of windows, the pixel in the window is classified into two parts according to a gray threshold, i.e., a first group including pixels having gray level equal to or higher than the gray threshold and a second group including pixels having gray level lower than the gray threshold, the gray level of the pixel in the first group is set to 255, and the gray level of the pixel in the second group is set to 0. Accordingly, the above-described binary image is obtained, and the interferer may have less influence on the detection result.

In other arrangements of the present disclosure, the above-described binary image may also be obtained in other ways such as global threshold binarization process.

In S1240, a straight-line detection is performed on the binary image, and the lane line is extracted.

Figure 3:
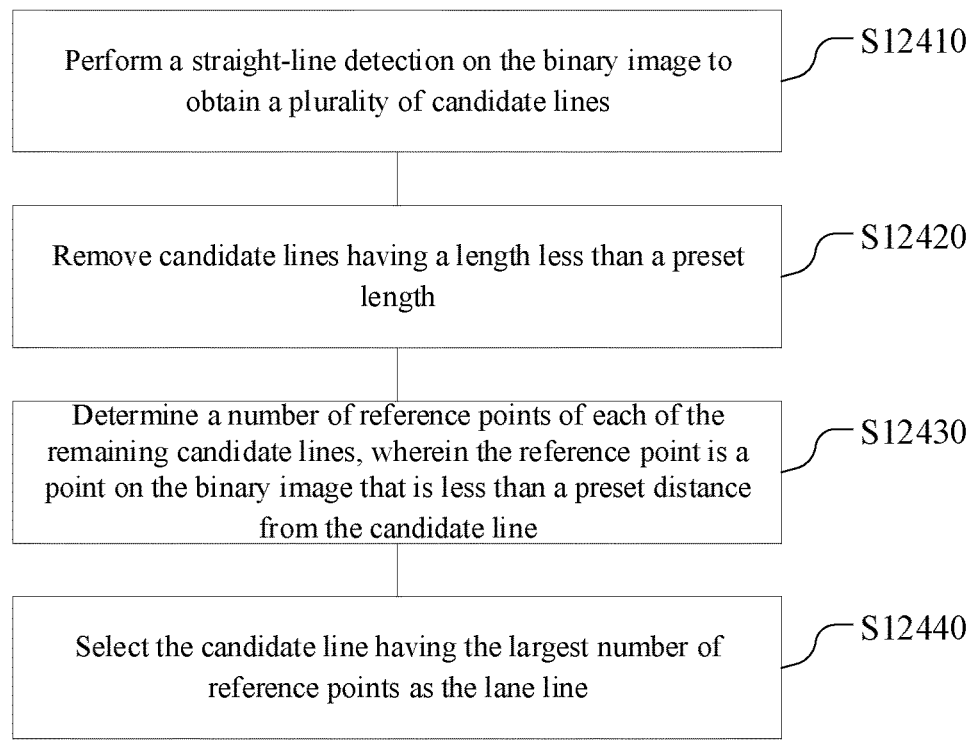
FIG. 3 is a flowchart of S1240 in FIG. 2.

As shown in FIG. 3, S1240 may include S12410 to S12440.

In S12410, a straight-line detection is performed on the binary image to obtain a plurality of candidate lines.

The binary image can be straight-line detection by Hough transform to obtain a plurality of straight lines, which are candidate lines. At the same time, the line with a large error can be removed by limiting the angular range of the straight line, thus reducing false detection. For example, the angle of the straight-line can range from −90° to −70° and 35° to 45°, the straight lines outside these two ranges can be removed to reduce false detection. The specific principles of the Hough transform are well known to those skilled in the art and will not be described in detail herein. In addition, it is also possible to use other algorithms that can be used for straight-line detection to perform straight-line detection on the above binary image, not to be all inclusive.

In S12420, candidate lines having a length smaller than a preset length are removed.

A predetermined length may be determined according to empirical knowledge and calculation data. It is indicated that the candidate line is not a lane line if the length of the candidate line is less than the preset length, and the candidate line may be the lane line if the length of the candidate line is greater than or equal to a preset length to make it easy to extract a lane line. The preset length may be determined according to experimental adjustment, or may be empirical data, and is not specifically limited herein.

In S12430, a number of reference points of each of the remaining candidate lines is determined, where the reference point is a point on the binary image that is less than a preset distance from the candidate line.

Taking one remaining candidate line as an example, a straight line fitting may be performed by a Ransac algorithm in a preset neighborhood near the candidate line to improve the accuracy of the candidate line. Obviously, other algorithms may also be used for straight line fitting, not to be all inclusive. Then, a point at which the distance from the candidate line is less than the preset distance, i.e., a reference point, is found on the binary image, and the number of reference points is calculated. The number of reference points for each candidate line can be determined in the manner described above.

In S12440, the candidate line having the largest number of reference points is selected as the lane line.

Each candidate line can be scored and sorted according to the number of reference points, and one candidate line with the highest score is selected as the lane line. The formula for calculating the score is as follows:

$$score=k_1 \times num;$$

Where score is the score of the candidate line, num is the number of reference points, and $k_1$ is a coefficient which is greater than 0. The score value is within a predetermined range for comparison by selecting the coefficient. It can be seen that the larger the number num of reference points of a candidate line is, the higher the score of the candidate line is, and the candidate line selected as the lane line is the candidate line with the largest number of reference points.

In S130, the distance between the inspection device and the lane line is determined.

Figure 4:
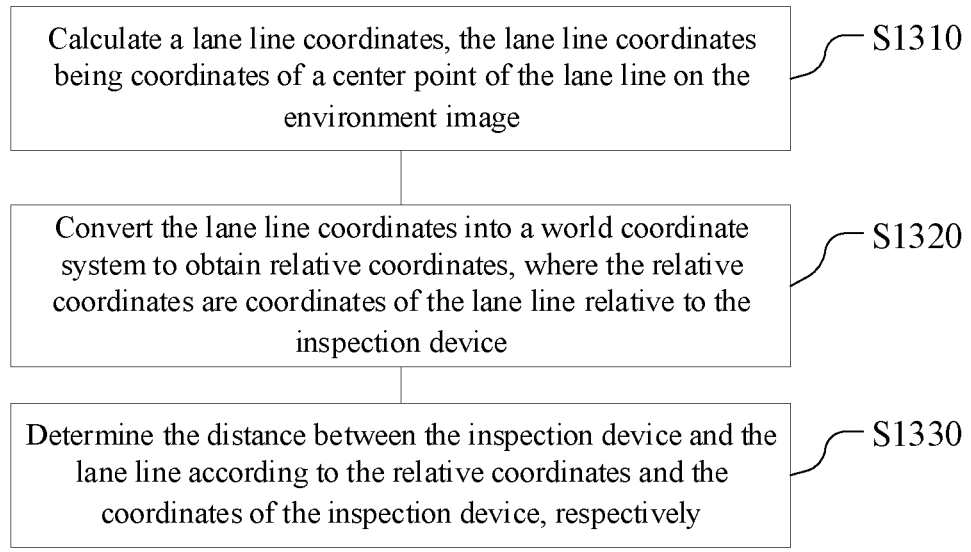
FIG. 4 is a flowchart of S130 in FIG. 1.

The location of the inspection device can be determined by a positioning module provided by the inspection device, and the positioning module can include a GPS positioning component. As shown in FIG. 4, S130 may include S1310 to S1330.

In S1310, the lane line coordinates are calculated, and the lane line coordinates are the coordinates of the center point of the lane line on the environment image.

The center point of the lane line is the center pixel of the image of the lane line, the center point is also a pixel of the corresponding environmental image. The coordinate of each pixel on the environment image may be determined in advance, and then the pixel corresponding to the center point of the lane line may be determined, and the coordinates corresponding to the pixel are the coordinates of the lane line.

In S1320, the lane line coordinates are converted into the world coordinate system to obtain the relative coordinates, where the relative coordinates are the coordinate of the lane line relative to the inspection device.

Taking a lane line as an example, the lane line coordinates (u, v) are converted into the world coordinate system to obtain coordinates (X, Y, Z) relative to the inspection device. Where, the center of the projection of the camera corresponding to the lane line on the ground is the origin, Z is the installation height of the camera, X represents the position of the camera in the X direction, and Y represents the position of the camera in the Y direction, the X direction and the Y direction are perpendicular to each other. The conversion formula for converting lane line coordinates to the world coordinate system is:

$$\begin{bmatrix} u \\ v \\ 1 \end{bmatrix} = k \begin{bmatrix} f_u & 0 & u_0 \\ 0 & f_v & v_0 \\ 0 & 0 & 1 \end{bmatrix} \begin{bmatrix} R & T \\ 0 & 1 \end{bmatrix} \begin{bmatrix} X \\ Y \\ Z \\ 1 \end{bmatrix};$$

in the arrangement, $f_u$, $f_v$, $u_0$ and $v_0$ are the internal camera parameters, $f_u$ and $f_v$ represent the focal length of the camera in the u and v directions respectively, $u_0$ and $v_0$ represent the optical center coordinates of the camera, and $f_u$, $f_v$, $u_0$ and $v_0$ can be obtained by calibration of the internal camera parameters. R and T can be obtained by calibration of the external camera parameters. R is the rotation matrix between the world coordinate system and the camera coordinate system, and T is the translation matrix between the world coordinate system and the camera coordinate system.

The $f_u$, $f_v$, $u_0$ and $v_0$ of camera can be calculated by using the Zhang Zhengyou calibration algorithm. Specifically, Zhang Zhengyou checkerboard calibration algorithm can be used, in which the image with the checkerboard is placed in front of the camera and at least three images of different angles and positions are taken, which is called a camera calibration image. Thereafter, the camera calibration image is processed using the Zhang Zhengyou calibration algorithm and the camera internal parameters, i.e. the $f_u$, $f_v$, $u_0$ and $v_0$ are calculated automatically. Obviously, other methods can be used to calculate the $f_u$, $f_v$, $u_0$ and $v_0$ of the camera.

The R and T can be obtained by calibrating external camera parameters. The center position of the checkerboard calibration plate coincides with the origin of the world coordinate system, and the checkerboard calibration plate is placed horizontally on the ground. The checkerboard edge is parallel to the ground edge. Six vertexes are selected on the checkerboard and the world coordinates of the six vertexes are recorded respectively, one frame of image is collected by camera, and the pixel coordinates of the six vertexes are extracted in the image. 12 external parameters can be calculated with these 6 coordinate points. In order to calculate the accuracy, the board can be placed on the ground at different positions, and the above process is repeated to calculate the average value of the external parameters obtained in different times to obtain the R and T.

In S1330, the distance between the inspection device and the lane line is determined according to the relative coordinates and the coordinates of the inspection device, respectively.

Taking one lane line as an example, its coordinates in the world coordinate system are (X, Y, Z), and Y is the distance of the lane line from the inspection device. If the distances between the two lane lines and the inspection device are the same, the inspection device patrols along the centerline of the lane; and if the distances between the two lane line and the inspection device are different, the inspection device deviates from the centerline of the lane.

In S140, a deviation between the inspection device and a preset route of the lane is determined according to the distance between the inspection device and the lane line.

The deviation is the difference between the distances between the inspection device and the two lane lines. For example, the deviation $\Delta d = Y_l - Y_r$, $Y_l$ is the distance between the inspection device and the left lane line, and $Y_r$ is the distance between the inspection device and the right lane line. For example, in the arrangement shown in FIG. 5, the preset route is the center line of the lane, and thus the difference between the distances between the inspection device and the left and right lane lines is the deviation, which is shown by $\Delta d$ in FIG. 5. However, the present disclosure is not limited thereto, and when the preset route is another route within the lane, the deviation may be determined by other ways. For example, when the preset route is a route whose distance from the left lane line is A, the deviation may be $\Delta d = Y_l - A$, where $Y_l$ is the distance between the inspection device and the left lane line. Similarly, the deviation can also be determined based on the right lane line.

In S150, the inspection device is controlled to move toward the preset route of the lane according to the deviation.

Figure 5:
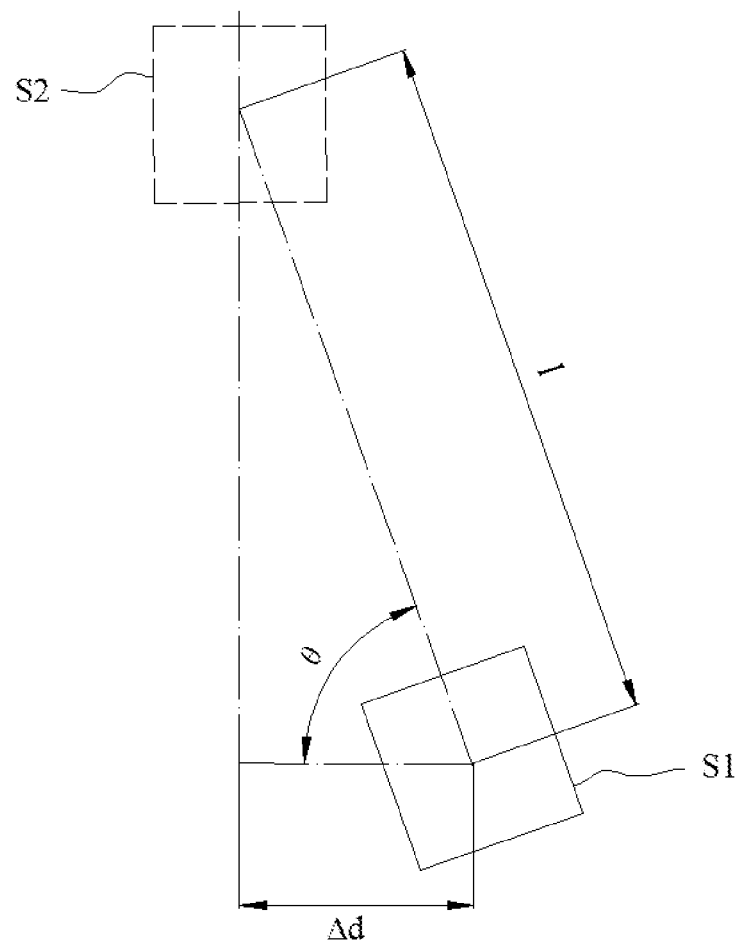
FIG. 5 is a principle diagram of a control method according to an arrangement of the present disclosure.

The preset route is the center line of the lane. As shown in FIG. 5, the correction distance can be determined according to a preset correction angle, which is an angle at which the inspection device moves toward the center line of the lane, and the relation among the correction angle, the correction distance, and the deviation $\Delta d$ is:

$$l = \frac{\Delta d}{\cos \theta};$$

in the arrangement, θ is the correction angle and l is the correction distance. It can be seen that the smaller the correction angle θ is, the smaller the correction distance l is, while the larger the steering amplitude of the inspection device is. Therefore, the correction angle θ can be smaller as long as the driving of the inspection device is stable. The S1 in FIG. 5 is the position at which the inspection device is deviated, and the S2 is the position after the inspection device is corrected.

As an example, $Y_l$ is the distance between the inspection device and the left lane line, and $Y_r$ is the distance between the inspection device and the right lane line. When the deviation is negative, that is, when $\Delta d$ is less than zero, the inspection device is shifted to the left. At this time, the inspection device can be controlled to move from left to right along the correction angle θ toward the center line of the lane, and the moving distance is the corrected distance l. When the deviation is positive, that is, when $\Delta d$ is greater than zero, the inspection device is shifted to the right. At this time, the inspection device can be controlled to move from right to left along the correction angle θ toward the center line of the lane, and the moving distance is the corrected distance l. When the deviation is zero, that is, when $\Delta d$ is equal to zero, the inspection device is straight ahead with no need to control the inspection device to move to the left or right.

In other arrangements of the present disclosure, only one lane line is identified, and the preset route is a center line, and the deviation of the inspection device from the preset route is the difference between the distance between the inspection device and the lane line and the distance between the lane line and center line. When the deviation is greater than the distance between the lane line and the center line, the inspection device can be controlled to move toward the lane line. When the deviation is smaller than the distance between the lane line and the center line, the inspection device can be controlled to move away from the lane line. Thus the deviation can be reduced so that the inspection device to patrol along the centerline of the lane, i.e., patrols within the lane along a predetermined route.

It should be noted that, such terms as "center line" or "centerline" as used in the present disclosure may be a virtual line between the left and right lanes line having equal distance to the left and right lane lines, which is unnecessary to actually be drawn on the lane.

The following are arrangements of the disclosed apparatus that can be used to perform the method of the present disclosure. For details not disclosed in the arrangements of the disclosed apparatus, reference is made to arrangements of the disclosed methods.

An exemplary arrangement of the present disclosure provides a control apparatus for an inspection device which can patrol within one lane of a highway, the lane can be divided by a lane line, and the lane has at least one lane line, for example, the lane may have two lane lines, that is the lane is defined between two lane lines, and the preset route may be the centerline of the lane. Meanwhile, the inspection device may be an inspection robot, and may also be other devices that can be used to drive in the lane and detect the road surface.

Figure 6:
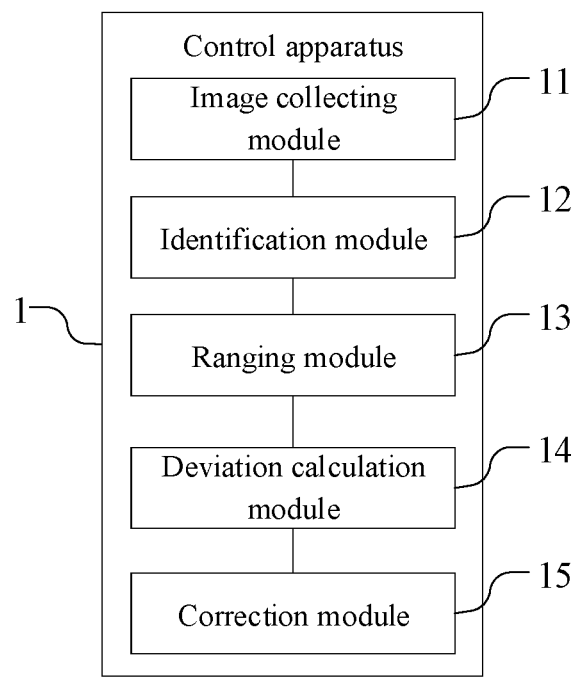
FIG. 6 is a block diagram of a control apparatus according to an arrangement of the present disclosure.

As shown in FIG. 6, the control apparatus 1 may include an image collecting module 11, an identification module 12, a ranging module 13, a deviation calculation module 14, and a correction module 15.

In this arrangement, the image collecting module 11 can be configured to collect an environment image around the inspection device.

In one arrangement, the image collecting module 11 may receive image signal from image capturer 121 disposed on the inspection device through a data interface.

Figure 7:
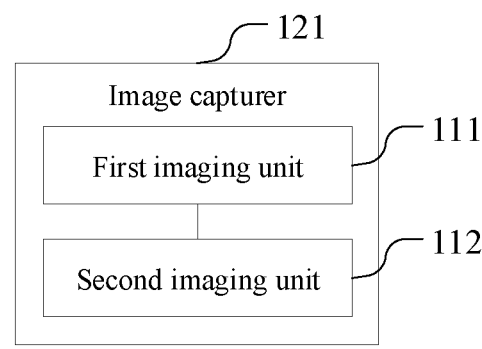
FIG. 7 is a block diagram of the image collecting module in FIG. 6.

As shown in FIG. 7, the image capturer 121 may include a first imaging unit 111 and a second imaging unit 112.

The first camera unit 111 can be a camera, which can be disposed on the left side of the inspection device for collecting an environment image on the left side of the inspection device.

The second camera unit 112 can be a camera, which can be disposed on the right side of the inspection device for collecting an environment image on the right side of the inspection device.

In the present arrangement, the identification module 12 can be configured to identify the lane line from the environmental image.

In this arrangement, the ranging module 13 can be configured to determine a distance between the inspection device and the lane line when the identification module 12 identifies at least one lane line.

In this arrangement, the deviation calculation module 14 is configured to determine a deviation between the inspection device and a preset route in the lane according to the distance between the inspection device and the lane line.

In this arrangement, the correction module 15 is configured to control the inspection device to move toward the preset route according to the deviation.

The specific details of each unit and module in the above control apparatus have been described in detail in the corresponding control method, and therefore will not be described herein.

In addition, it should be understood that each of the above units and modules may be implemented by a correspondingly configured circuit or other hardware. For example, the imaging unit may be a photosensitive circuit that converts an optical signal into an electrical signal. However, the present disclosure is not limited thereto, and the imaging unit may include an optical system, a control circuit, and the like in addition to the above-described photosensitive circuit. In one arrangement, the imaging unit can be a camera. As another example, the image collecting module can include a corresponding collecting circuit to collect and transmit electrical signals from the imaging unit to subsequent processing circuits for further processing. Other modules involved in the present disclosure may also be configured accordingly, and will not be described again herein.

Figure 9:
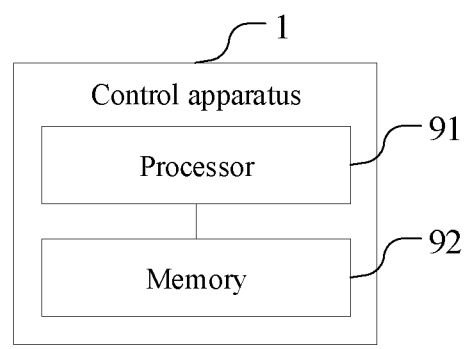
FIG. 9 is a block diagram of a control apparatus according to an arrangement of the present disclosure.

In addition, in another arrangement of the present disclosure, the foregoing units and modules may also be implemented by software. For example, as shown in FIG. 9, the control apparatus 1 may include a processor 91 and a memory 92. The memory stores computer readable instructions, which enabled the processor to perform a control method according to an arrangement of the present disclosure when computer readable code is executed.

Figure 8:
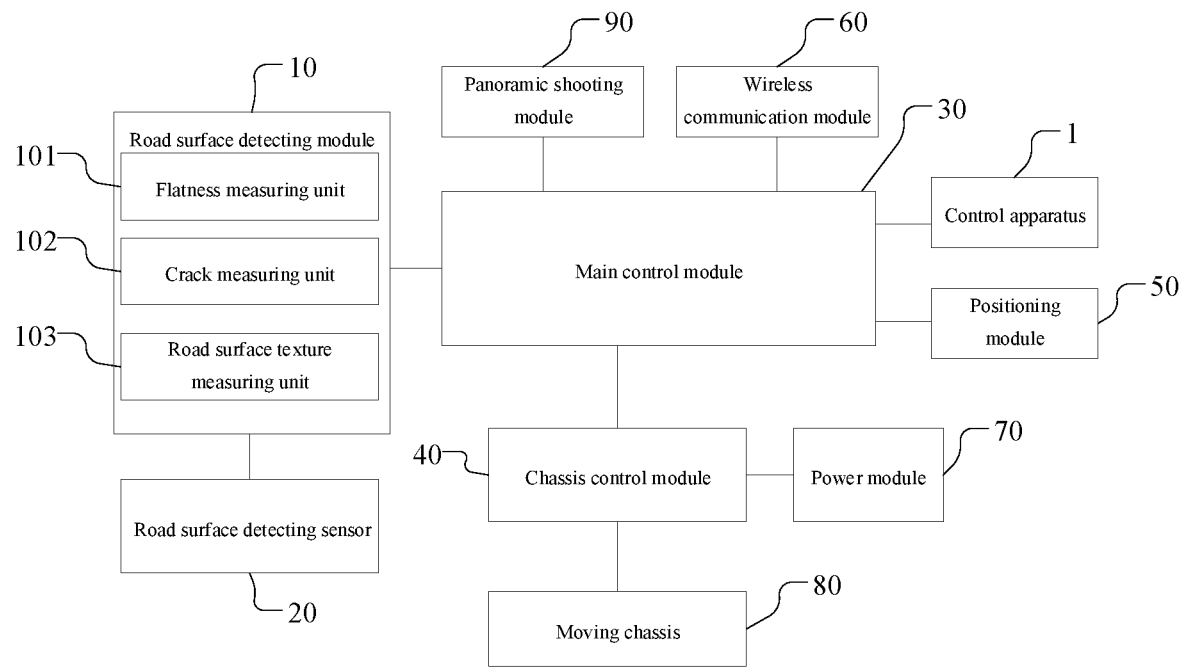
FIG. 8 is a block diagram of an inspection device according to an arrangement of the present disclosure.

As shown in FIG. 8, an exemplary arrangement of the present disclosure provides an inspection device that can include the above-described control apparatus 1.

The inspection device may further include a road surface detecting module 10, a road surface detecting sensor 20, a main control module 30, a chassis control module 40, a positioning module 50, a wireless communication module 60, a power module 70, a moving chassis 80, and a panoramic shooting module 90.

The road surface detecting module 10 includes a flatness measuring unit 101, a crack measuring unit 102, and a road surface texture measuring unit 103, which can perform flatness measurement, crack detection, and texture detection on the road surface. Obviously, other units may also be included, not to be all inclusive.

The road surface detecting sensor 20 may include a camera, a high frequency laser sensor, an accelerometer, a laser scanner, and the like.

The main control module 30 can include a circuit board and a microprocessor for processing signals and outputting instructions. The control apparatus 1 can be connected to the main control module 30.

The mobile chassis 80 can include a plurality of Mecanum wheels and a plurality of drive components, each of which can include a motor and a retarder, each drive component driving a respective Mecanum wheel in a one-to-one correspondence.

The chassis control module 40 can control the mobile chassis 80 according to an instruction issued by the main control module 30, and can realize the motion functions of the inspection device such as forward, left turn, right turn and the like. The driving mode of the mobile chassis is not limited herein.

The positioning module 50 is configured to position the inspection device, determine the coordinates of the inspection device, and enable the inspection device to move within the lane by cooperation with the chassis control module 40. The positioning module 50 can include a GPS positioning component for implementing rough positioning of the inspection device, and the server (the center console) can know the rough position of the inspection device.

The wireless communication module 60 can remotely send the detection information to the server (center console) or other inspection device, and the detection information can include the result detected by the road surface detecting module 10, the status information of the inspection device (such as insufficient power, fault, etc.) or command feedback and the like.

The panoramic photographing device 90 is configured to collect the surrounding panoramic image, and the wireless communication module 60 can send the panoramic image to the server after receiving the command.

The power module 70 can supply power to each of the above modules, and can include a power management unit and a power storage unit.

Obviously, the inspection device may also include other modules or units. For details, reference is made to the existing inspection device, which will not be described in detail herein.

The inspection device, the control method for the inspection device, and the control apparatus for the inspection device of the present disclosure can collect an environment image around the inspection device, and identify at least one lane line from the environment image, and control the inspection device to automatically move toward the preset route of the lane according to the deviation between the inspection device and the lane line, and thus realizing the automatic correction of the inspection device, which is beneficial to ensure the detection effect, and it can automatically steer as the lane turns, reducing manual control, which is beneficial to improve detection effectiveness.

It should be noted that although several modules or units of device for action execution are mentioned in the detailed description above, such division is not mandatory. In fact, the features and functions of two or more of the modules or units described above may be embodied in one module or unit according to the arrangements of the present disclosure. Rather, the features and functions of one of the modules or units described above may be embodied by further being divided into multiple modules or units.

In addition, although the various blocks of the method of the present disclosure are described in a particular order in the figures, it is not required or implied that the blocks must be performed in the specific order, or all the blocks shown must be performed to achieve the desired result. Additionally or alternatively, certain blocks may be omitted, multiple blocks can be performed by combining into one block, and/or one block can be performed by breaking into multiple blocks and the like.

Through the description of the above arrangements, those skilled in the art will readily understand that the example arrangements described herein may be implemented by software or by software in combination with necessary hardware. Therefore, the technical solution according to an arrangement of the present disclosure can be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, mobile terminal, or network device, etc.) to perform a method according to an arrangement of the present disclosure.

Other arrangements of the present disclosure will readily occur to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as exemplary only, the spirit and scope of the present disclosure is therefore intended to be limited solely by the scope of the appended claims.

What is claimed is:

1. A control method for an inspection device patrolling in a lane, comprising:
    collecting an environment image around the inspection device;
    identifying a lane line of the lane from the environment image;
    determining a distance between the inspection device and the lane line when the lane line is identified;
    determining a deviation between the inspection device and a preset route in the lane according to the distance between the inspection device and the lane line; and
    controlling the inspection device to move toward the preset route according to the deviation,
    wherein the preset route is a center line of the lane, and wherein
    in a case where only one lane line is identified, the deviation is a difference between a first distance between the inspection device and the lane line and a second distance between the lane line and the center line; and
    in a case where two lane lines are identified, the deviation is a difference between respective distances of the inspection device and the two lane lines,
    wherein the two lane lines comprise a left lane line and a right lane line, and the deviation is a difference between a third distance and a fourth distance, the third distance between the inspection device and the left lane line and the forth distance between the inspection device and the right lane line, and
    the controlling the inspection device to move toward the preset route of the lane comprises:
    controlling the inspection device to move to the right side of the lane when the deviation is negative; and
    controlling the inspection device to move to a left side of the lane when the deviation is positive,
    wherein the controlling the inspection device to move toward the preset route of the lane comprises:
    determining a correction distance according to a preset correction angle, the correction angle being an angle at which the inspection device moves toward the preset route, and a relationship between the correction angle, the correction distance, and the deviation being:

$$l = \frac{\Delta d}{\cos \theta};$$

wherein $\Delta d$ is the deviation, $\theta$ is the correction angle, and $l$ is the correction distance; and
    controlling the inspection device to travel the correction distance at the correction angle.

2. The control method according to claim 1, wherein the collecting the environment image around the inspection device comprises collecting a first environment image at one side of the inspecting device and a second environment image at another side of the inspecting device.

3. The control method according to claim 1, wherein the identifying the lane line from the environment image comprises identifying the lane line according to a red component and green component in the environment image.

4. The control method according to claim 1, wherein the identifying the lane line from the environment image comprises:
preprocessing the environment image to obtain a grayscale image of the environment image;
transforming the grayscale image to obtain a feature image;
binarizing the feature image to obtain a binary image; and
performing a straight-line detection on the binary image, and extracting the lane line.

5. The control method according to claim 4, wherein the preprocessing the environment image comprises:
performing gradation processing on the environment image;
extracting a preset area of the environment image after the gradation processing as the grayscale image.

6. The control method according to claim 4, wherein the grayscale image is a single channel grayscale image.

7. The control method according to claim 4, wherein the binarizing the feature image to obtain the binary image comprises:
dividing the feature image into a plurality of windows;
classifying, according to a preset grayscale threshold, pixels in each of the plurality of windows into a first group of pixels having a first grayscale equal to or greater than the preset grayscale threshold and a second group of pixels having a second grayscale smaller than the preset grayscale threshold;
setting the first grayscale as 255; and
setting the second grayscale as 0.

8. The control method according to claim 4, wherein the extracting the lane line comprises:
performing the straight-line detection on the binary image to obtain a plurality of candidate lines;
removing candidate lines having a length less than a preset length;
determining a number of reference points of each of the candidate lines excluding the removed candidate lines, wherein the reference point is a point on the binary image that is less than a preset distance from the candidate line; and
selecting one from the plurality of candidate lines excluding the removed candidate lines that has the largest number of reference points as the lane line.

9. The control method according to claim 8, wherein the determining the number of the reference points comprises:
fitting each remaining candidate line within a preset neighborhood; and
calculating the number of the reference points.

10. The control method according to claim 1, wherein the determining a distance between the inspection device and the lane line comprises:
calculating lane line coordinates, the lane line coordinates being coordinates of a center point of the lane line on the environment image;
converting the lane line coordinates into a world coordinate system to obtain relative coordinates, wherein the relative coordinates are coordinates of the lane line relative to the inspection device; and
determining the distance between the inspection device and the lane line according to the relative coordinates and coordinates of the inspection device.

11. A control apparatus for an inspection device patrolling in a lane, the lane having at least one lane line, the control apparatus comprising:
an image collecting circuit configured to collect an environment image around the inspection device;
an identification circuit configured to identify the lane line from the environment image;
a ranging circuit configured to determine a distance between the inspection device and the lane line when at least one lane line is identified;
a deviation calculation circuit configured to determine a deviation between the inspection device and a preset route of the lane according to the distance between the inspection device and the lane line; and
a correction circuit configured to control the inspection device to move toward the preset route according to the deviation,
wherein the preset route is a center line of the lane, and wherein
in a case where only one lane line is identified, the deviation is a difference between a first distance between the inspection device and the lane line and a second distance between the lane line and the center line; and
in a case where two lane lines are identified, the deviation is a difference between respective distance of the inspection device and the two lane lines,
wherein the two lane lines comprise a left lane line and a right lane line, and the deviation is a difference between a third distance and a fourth distance, the third distance between the inspection device and a left lane line and the fourth distance between the inspection device and the right lane line, and
the controlling the inspection device to move toward the preset route of the lane comprises:
controlling the inspection device to move to a right side of the lane when the deviation is negative ,and
controlling the inspection device to move to the left side of the lane when the deviation is positive,
wherein the controlling the inspection device to move toward the preset route of the lane comprises:
determining a correction distance according to a preset correction angle, the correction angle being an angle at which the inspection device moves toward the preset route, and a relationship between the correction angle, the correction distance, and the deviation being:

$$l = \frac{\Delta d}{\cos\theta},$$

wherein $\Delta d$ is the deviation, $\theta$ is the correction angle, and l is the correction distance, and
controlling the inspection device to travel the correction distance at the correction angle.

12. The control apparatus according to claim 11, wherein the inspection device comprises:
an image capturer configured to capture the environment image around the inspection device.

13. The control apparatus of claim 12, wherein the image capturer comprises:
a first camera disposed on a first side of the inspection device and configured to collect a first environment image on the first side of the inspection device; and a second camera disposed on a second side of the inspection device and configured to collect a second environment image on the second side of the inspection device.

14. The inspection device comprising the control apparatus of claim 11.

15. A control apparatus comprising:
a processor; and
a memory storing computer readable code, which enables the processor to perform the control method for the inspection device according to claim 1 when computer readable code is executed.

16. The control apparatus according to claim 15, wherein the inspection device comprises:
an image capturer configured to capture the environment image around the inspection device, and
wherein the image capturer comprises:
a first camera disposed on a first side of the inspection device and configured to collect a first environment image on the first side of the inspection device; and
a second camera disposed on a second side of the inspection device and configured to collect a second environment image on the second side of the inspection device.

17. The inspection device comprising the control apparatus of claim 15.

* * * * *